July 4, 1944.  R. G. NOBLE  2,352,967

LOCK

Filed March 12, 1943

Inventor.
Robert G. Noble.
by H. J. Sanders
Attorney.

Patented July 4, 1944

2,352,967

UNITED STATES PATENT OFFICE 2,352,967

LOCK

Robert G. Noble, Chicago, Ill.

Application March 12, 1943, Serial No. 478,956

2 Claims. (Cl. 70—232)

This invention relates to improvements in locks and more particularly to locks for vehicle wheels such as automobile wheels, etc. although capable of other uses. One object is to provide a lock applicable for use on one of the wheel retaining bolts, studs or nuts for locking the same securely to the wheel thus effectually preventing removal of the wheel from the vehicle axle.

A further object is to provide a lock adapted for application to the bolt, stud or nut without alteration or weakening of the same in any way.

A still further object is to provide a wheel lock that is readily and interchangeably applicable to the various types of wheels of the different makes of automobiles so that it may be used selectively upon one or any of them.

A further object is to provide a lock of simple construction that is durable in use, inexpensive to manufacture, readily applied and as readily removed by authorized persons and that in use is entirely efficient, tamper-proof, pry-proof and secure against the efforts of unauthorized persons.

A further object is to provide a lock, key operated, adapted to be manufactured in sets, the locks of a set being capable of operation by a common key; the locks of different sets being operated only by different keys.

With the foregoing and other objects in view the invention consists in the combination and arrangement of parts to be hereinafter fully described, pointed out in the claims and illustrated in the accompanying drawing which forms a part of this patent and in which—

Like reference characters denote corresponding parts throughout the several views.

Figure 1:
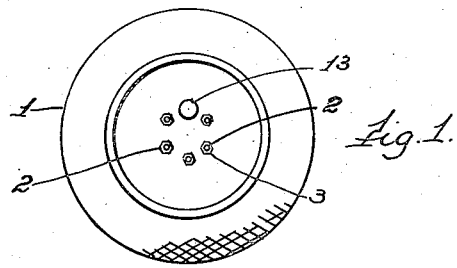
Fig. 1 is a view in elevation of a vehicle wheel illustrating the application of the lock.
Figure 2:
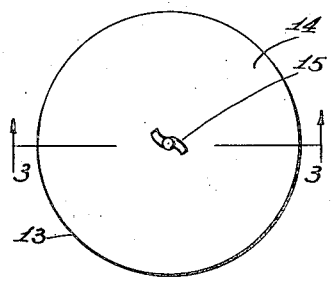
Fig. 2 is a face view of Fig. 3 in elevation with the wheel omitted.
Figure 3:
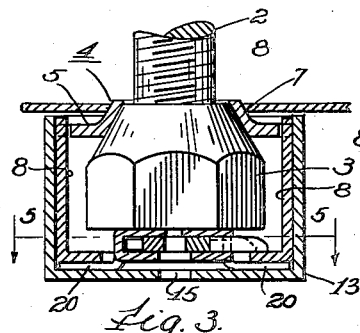
Fig. 3 is a view through Fig. 2 in horizontal cross section on the line 3—3 of Fig. 2.
Figure 4:
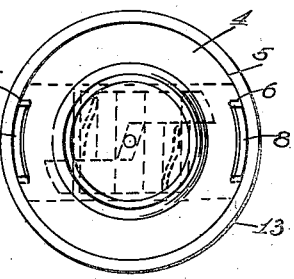
Fig. 4 is a view of the lock in elevation taken from the open side of the cap or casing.
Figure 5:
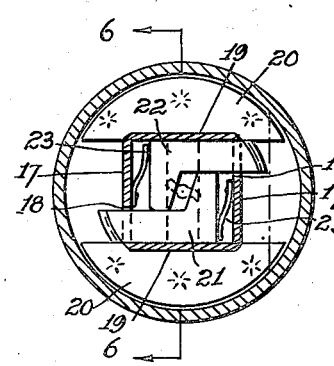
Fig. 5 is a vertical cross sectional view through Fig. 3 on the line 5—5.
Figure 6:
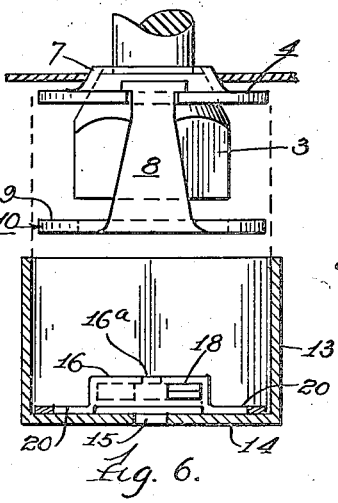
Fig. 6 is a longitudinal central vertical sectional view through the lock with the cap or casing and the lock bolts detached from and about to be applied to the yoke assembly which is shown applied to the wheel and one nut thereof, the view being taken substantially on the line 6—6 of Fig. 5.
Figure 7:
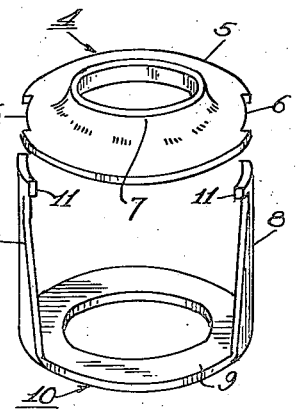
Fig. 7 is a view in perspective of the yoke assembly.
Figure 8:
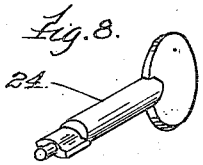
Fig. 8 is a view of the key in perspective.

The reference numeral 1 denotes an automobile wheel provided with the usual wheel retaining studs or bolts 2 having tapered nuts or heads 3. The present lock is adapted for application to any one of the nuts 3 in such manner as to prevent its removal from its bolt or of the latter from the wheel. The lock includes a two-piece yoke adapted for direct application to the nut or head 3. In certain types of vehicles the stud 2 with its head is removed when it is desired to remove the wheel while in another types the stud 2 remains in the wheel while the nut 3 is removed. In either case the annular band portion 4 of the yoke is applied direct to the beveled inner end of the nut or head 3, said band having an outer periphery 5 formed with diametrically opposed similar notches 6, 6 and with a tapered neck portion 7 conforming to the contour of the inner tapered end of the head or nut to be received therein, said neck terminating in the periphery defining the band perforation and being spaced laterally from the outer periphery 5. Removably received in the notches 6 of said band are the resilient prongs 8, 8 diametrically opposed, two in number, and extending from the annular base 9 of the fork 10, said prongs terminating in the flanges 11 that extend beyond the end walls of notches 6 to prevent withdrawal therefrom in one direction of said prongs.

The prongs 8, 8 receive therebetween the nut or head 3, the inner diameter of said base 9 being less than the diameter of the nut or head 3 at its larger end. A lock cap or casing 13 round in cross section and having one closed end 14 in which is formed a key hole 15 is provided, said casing having an inside diameter slightly greater than the outside diameter of the base 9 or band 4 so that said members may be snugly received therein. Also received within said lock casing upon the base or closed end thereof is the lock bolt housing substantially square in cross section having the inverted base 16 formed with the perforation 16a in line with the casing perforation 15, side walls 17, 17 each having a perforation 18 therein, said perforations being diagonally opposite each other contiguous to said inverted base 16, and side walls 19, 19, the free ends of said walls being bent outwardly to form flat wings 20, 20 curved peripherally to the contour of the casing wall, said wings being disposed upon the inner face of the closed end of casing 13 and preferably spot-welded or otherwise secured thereto. The free ends of the side walls 17, 17 are bent inwardly toward each other and are spaced apart in line with the perforations 15, 16a, said wall ends cooperating with the inverted base 16, as well as with said side walls to operatively retain the opposed cooperating L-shaped lock bolts 21, 22 each of which extends out from the housing through one perforation 18 in a wall 17, each lock bolt being engaged by a spring 23 interposed between it and a housing wall 17 to yieldingly retain said bolts in extended or operative position.

The diameter of the bolt casing is such that it is received snugly within the base 9 of the fork 10, the perforations 18 in housing walls 17 then being upon one side of said base while the wings 20, 20 are upon the opposite side thereof secured to the casing wall 14. The bolt locks 21, 22 are so shaped relatively that their inner ends within the housing are at all times spaced apart in line with the perforations 15, 16a to provide clearance for the key 24 adapted for insertion in said perforations between the spaced inner ends of walls 17, 17 and lock bolts 21, 22.

The key may now be turned to retract the lock bolts to positions wholly within their housing. To apply the lock the head 3 with or without the bolt or stud 2 is removed and the band 4 applied to the inner beveled end of said nut or head which is then replaced in the wheel. The fork 10 is now placed about the nut or head with its prongs engaging the notched periphery of said head. The lock casing is now applied upon said fork, the key 24 being inserted and the lock bolts retracted until the perforations 18 pass beyond the base 9 in the direction of the said band. The key 18 is now withdrawn whereupon the springs 23 will force outwardly the remote ends of the lock bolts to interfere with said base 9 should removal of the casing 13 be attempted. The wheel stud and nut or head are now effectually locked against withdrawal, tampering or prying by persons not provided with the proper key. This lock is centered upon the stud, bolt or nut so that its weight, though very slight, is evenly distributed thereabout and so will not tend to throw the wheel off balance when it is rotating at high speed.

Manifestly numerous changes and modifications in the details of the embodiments of the invention disclosed will become apparent to those skilled in the art. It is intended that all such changes and modifications be comprehended within the scope of the invention which is to be limited only by the claims appended hereto.

What is claimed is:

1. In a lock for beveled nuts, an annular band having a tapered neck shaped to the contour of said nut, said band being notched peripherally, a fork having flanged prongs for engagement with the notches of said band, a lock casing having a keyhole, a bolt housing secured in said lock casing and formed with a keyhole in line with said casing keyhole, said bolt housing having wall perforations, and lock bolts in said housing yieldingly protruding through said wall perforations and engaging said fork, said lock bolts being adapted for engagement by a key inserted in said casing and lock housing.

2. In a lock for beveled nuts, an annular band having a tapered neck shaped to engage said nut, said band being notched peripherally, a fork having flanged prongs for engagement with the notches of said band, the base of said fork being annular, a lock casing having a keyhole, a bolt housing secured in said lock casing and formed with a keyhole in line with said casing keyhole and being of a diameter less then the inner diameter of said fork base, said bolt housing having wall perforations, and lock bolts in said housing yieldingly protruding through said wall perforations for engagement with said fork base, said lock bolts being adapted for engagement by a key inserted in said casing and lock housing.

ROBERT G. NOBLE.